US012600066B2

(12) United States Patent
Yoon

(10) Patent No.: US 12,600,066 B2
(45) Date of Patent: Apr. 14, 2026

(54) MOLDING METHOD OF VEHICLE SPEAKER GRILL

(71) Applicant: SEOYON E-HWA CO., LTD., Anyang (KR)

(72) Inventor: Chiwon Yoon, Cheonan (KR)

(73) Assignee: SEOYON E-HWA CO., LTD., Anyang (KR)

( * ) Notice: Subject to any disclaimer, the term of this patent is extended or adjusted under 35 U.S.C. 154(b) by 90 days.

(21) Appl. No.: 18/775,189

(22) Filed: Jul. 17, 2024

(65) Prior Publication Data

US 2025/0058505 A1     Feb. 20, 2025

(30) Foreign Application Priority Data

Aug. 16, 2023     (KR) ........................ 10-2023-0107243

(51) Int. Cl.
    *B29C 45/14*          (2006.01)
    *B29C 45/00*          (2006.01)
                        (Continued)
(52) U.S. Cl.
    CPC .... B29C 45/14827 (2013.01); B29C 45/1761 (2013.01); *B29C 2045/0075* (2013.01);
                        (Continued)
(58) Field of Classification Search
    CPC ........ B29C 45/14827; B29C 45/14016; B29C 45/14262; B29C 2045/14442
    See application file for complete search history.

(56) References Cited

U.S. PATENT DOCUMENTS 4,931,248 A *  6/1990  Willemin .......... B29C 45/14688
                                          156/240
6,475,423 B1 * 11/2002  Masterson ........ B29C 45/14065
                                          264/296
(Continued)

FOREIGN PATENT DOCUMENTS

DE      102011102722 B4     5/2017
EP         0995571 A1     4/2000
                (Continued)

OTHER PUBLICATIONS

Google machine translation of KR20110013633A. (Year: 2025).*
(Continued)

*Primary Examiner* — Emmanuel S Luk
(74) *Attorney, Agent, or Firm* — Harvest IP Law, LLP

(57)          ABSTRACT

Disclosed is a molding method of a vehicle speaker grill. The disclosed molding method of a vehicle speaker grill includes a molding process of transferring a printed film to an injection molded product; and a post-process of processing the injection molded product to which the printed film is transferred, in which the molding process includes charging a printed film between a first mold and a second mold, mold closing the first mold and the second mold, injecting a resin between the printed film and a concave portion of the irregularity, and transferring a portion of the printed film, and mold opening the first mold and the second mold and extracting the injection molded product, and the post-process includes removing the transferred portion other than the upper surface of the injection molded product from the transferred printed film by injecting air into the upper surface of the extracted printed film.

9 Claims, 10 Drawing Sheets

(51) Int. Cl.
  *B29C 45/17*       (2006.01)
  *B29L 31/34*       (2006.01)

(52) U.S. Cl.
  CPC ........................... *B29C 2045/0077* (2013.01);
       *B29K 2995/002* (2013.01); *B29L 2031/3418*
                            (2013.01)

(56)                References Cited

U.S. PATENT DOCUMENTS

| | | | | |
|---|---|---|---|---|
| 6,504,928 | B1* | 1/2003 | Toyooka | B29C 45/14827 |
| | | | | 379/433.01 |
| 2001/0040001 | A1* | 11/2001 | Toyooka | B29C 45/14221 |
| | | | | 156/233 |
| 2004/0219464 | A1* | 11/2004 | Dunham | G03H 1/02 |
| | | | | 430/320 |
| 2008/0275400 | A1* | 11/2008 | Ferguson | B29C 45/561 |
| | | | | 264/153 |
| 2009/0085237 | A1* | 4/2009 | Wolgamott | B29C 45/14262 |
| | | | | 264/40.5 |
| 2009/0098339 | A1* | 4/2009 | Marceau | B29C 48/001 |
| | | | | 428/151 |
| 2010/0072663 | A1* | 3/2010 | Chang | B29C 45/14827 |
| | | | | 264/255 |
| 2011/0059286 | A1* | 3/2011 | Ullrich | B29C 45/14827 |
| | | | | 264/275 |

| | | | | |
|---|---|---|---|---|
| 2011/0084579 | A1* | 4/2011 | Chang | B29C 45/14778 |
| | | | | 264/447 |
| 2014/0113115 | A1* | 4/2014 | Ito | B32B 38/0036 |
| | | | | 427/372.2 |
| 2019/0111599 | A1* | 4/2019 | Matsuo | B29C 45/14778 |
| 2020/0122366 | A1* | 4/2020 | Goh | B29C 45/14786 |
| 2021/0146858 | A1* | 5/2021 | Aigner | B29C 45/1418 |
| 2022/0362976 | A1* | 11/2022 | Schroiff | C08L 53/02 |
| 2023/0405984 | A1* | 12/2023 | Okuda | B32B 7/12 |

FOREIGN PATENT DOCUMENTS

| | | | | | |
|---|---|---|---|---|---|
| KR | 1995-0030732 | A | 11/1995 | | |
| KR | 10-2000-0074238 | A | 12/2000 | | |
| KR | 10-0906747 | B1 | 7/2009 | | |
| KR | 10-2011-0013633 | A | 2/2011 | | |
| KR | 10-2015-0029164 | A | 3/2015 | | |
| KR | 10-2203655 | B1 | 1/2021 | | |
| KR | 10-2021-0090685 | A | 7/2021 | | |
| MY | 166127 | A * | 5/2018 | ....... | B29C 45/14827 |
| WO | 2023/094552 | A1 | 6/2023 | | |

OTHER PUBLICATIONS

Google machine translation of KR20150029164A. (Year: 2025).*
DE Office Action dated Dec. 16, 2025.
KR OA dated Oct. 19, 2023.
KR NOA dated Mar. 13, 2024.

* cited by examiner

MOLDING METHOD OF VEHICLE SPEAKER GRILL

CROSS-REFERENCE TO RELATED APPLICATIONS

This application claims the priority of Korean Patent Application No. 10-2023-0107243 filed on Aug. 16, 2023, in the Korean Intellectual Property Office, the disclosure of which is incorporated herein by reference.

BACKGROUND

Field

The present disclosure relates to a molding method of a vehicle speaker grill, and more particularly, to a molding method of a vehicle speaker grill with improved process efficiency compared to a painting process.

Description of the Related Art

A vehicle is equipped with an audio system, and a speaker grill is provided inside the vehicle as part of a speaker device. The speaker grill is a cover for a speaker device, and serves to protect a speaker unit and at the same time emit speaker sound to the outside.

Typically, the vehicle speaker grill is made of plastic or metal, but recently, as the interior of the vehicle has become more important, the speaker grill with improved aesthetics is being produced by combining plastic and metal. Specifically, an inner cover is made of plastic, an outer cover is made of metal, and the outer cover is stacked on the inner cover to manufacture the vehicle speaker grill.

The vehicle speaker grill was conventionally manufactured by painting (coating) the outer cover on the inner cover. However, the painting process not only includes many process steps, but also produces volatile organic compounds (VOCs) from materials used for painting, causing health problems for workers and air pollution.

Therefore, the present disclosure provides a molding process and a post-process that can replace the conventional painting process in the molding method for manufacturing a vehicle speaker grill, thereby increasing the efficiency and stability of the process and providing an eco-friendly molding method.

SUMMARY

An object to be achieved by the present disclosure is to provide a molding method of a vehicle speaker grill capable of manufacturing the vehicle speaker grill with improved aesthetics. An object to be achieved by the present disclosure is to provide a molding method of a vehicle speaker grill with improved process efficiency.

An object to be achieved by the present disclosure is to provide a molding method of a vehicle speaker grill with improved completeness of products.

An object to be achieved by the present disclosure is to provide a molding method of a vehicle speaker grill with improved process safety.

An object to be achieved by the present disclosure is to provide an eco-friendly molding method of a vehicle speaker grill.

A molding method of a vehicle speaker grill according to an exemplary embodiment of the present disclosure includes a molding process of transferring a printed film to an injection molded product; and a post-process of processing the injection molded product to which the printed film is transferred, in which the molding process includes charging a printed film between a first mold provided with a film molding groove part and a second mold provided with an insert part that is opposite to the film molding groove part and provided with a plurality of irregularities, mold closing the first mold and the second mold so that an upper surface of the irregularity is in contact with the printed film, injecting a resin between the printed film and a concave portion of the irregularity, and transferring a portion of the printed film, which is in contact with the injection molded product, to the injection molded product side by heat of the injection molded product, and mold opening the first mold and the second mold and extracting the injection molded product to which the printed film is transferred, and the post-process includes removing the transferred portion other than the upper surface of the injection molded product from the transferred printed film by injecting air into the upper surface of the extracted printed film.

The post-process may further include removing micro burrs of the printed film by rubbing the upper surface of the extracted printed film with a brush.

The molding process may further include curing the extracted printed film.

The molding process may further include vacuum molding the charged printed film into the film molding groove part.

The molding process may include moving a support member provided on an outer side of the second mold to the first mold to press and fix the charged printed film.

The concave portion may be provided in a shape of a hole recessed inside the second mold, and the molding process may further include processing the transferred printed film so that a size of the hole in the transferred printed film is smaller than that of the hole in the injection molded product.

In the molding process, the printed film may be provided with a metallic material.

In the molding process, the injection molded product may be made of a resin having a color that contrasts with a color of the printed film.

The film molding groove part may be recessed inside the first mold, and the insert part may protrude toward the first mold, and the film molding groove part is larger than the insert part, and in the molding process, when a resin is injected between the printed film and the concave portion of the irregularity, and the portion of the printed film in contact with the injection molded product is transferred to the injection molded product side by the heat of the injection molded product, the resin may also be injected between the concave portion provided at an outermost side of the insert part and an inner side surface of the film molding groove part.

The molding process may use ultraviolet rays when curing the extracted printed film.

The present disclosure provides a molding method of a vehicle speaker grill capable of manufacturing the vehicle speaker grill with improved aesthetics.

The present embodiment provides a molding method of a vehicle speaker grill with improved process efficiency.

The present embodiment provides a molding method of a vehicle speaker grill with improved product completeness.

The present embodiment provides a molding method of a vehicle speaker grill with improved process safety.

The present disclosure provides an eco-friendly molding method of a vehicle speaker grill.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
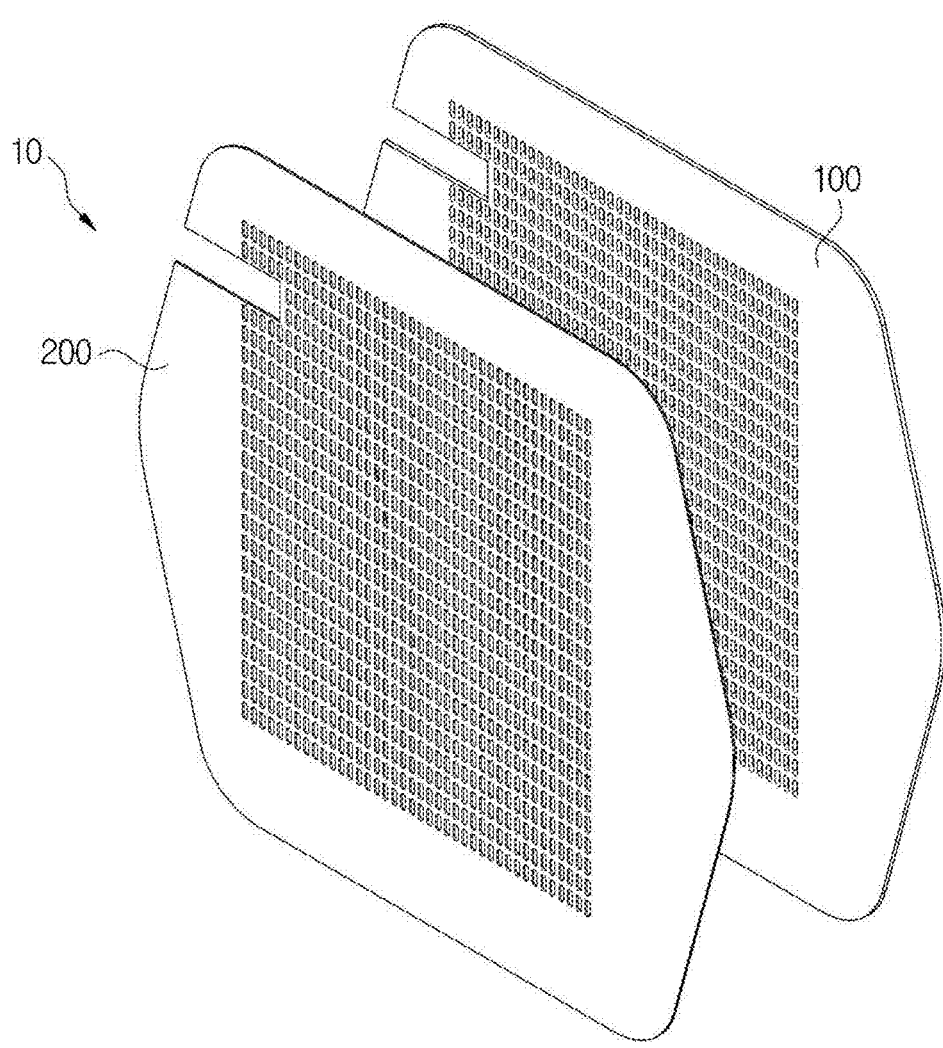
FIG. 1 is a perspective view illustrating a state before an injection molded product and a printed film are assembled in a vehicle speaker grill according to an embodiment of the present disclosure.

Hereinafter, the exemplary embodiment of the present disclosure will be described with reference to the accompanying drawings and exemplary embodiments as follows. Scales of components illustrated in the accompanying drawings are different from the real scales for the purpose of description, so that the scales are not limited to those illustrated in the drawings.

Hereinafter, embodiments of the present disclosure will be described in detail with reference to the accompanying drawings. The following embodiments are presented to sufficiently convey the idea of the present disclosure to those skilled in the art. The present disclosure is not limited only to the embodiments to be presented below, but may be embodied in other forms. In order to clarify the present disclosure, parts unrelated to the description may be omitted, and a size of components may be slightly exaggerated to aid understanding.

Figure 2:
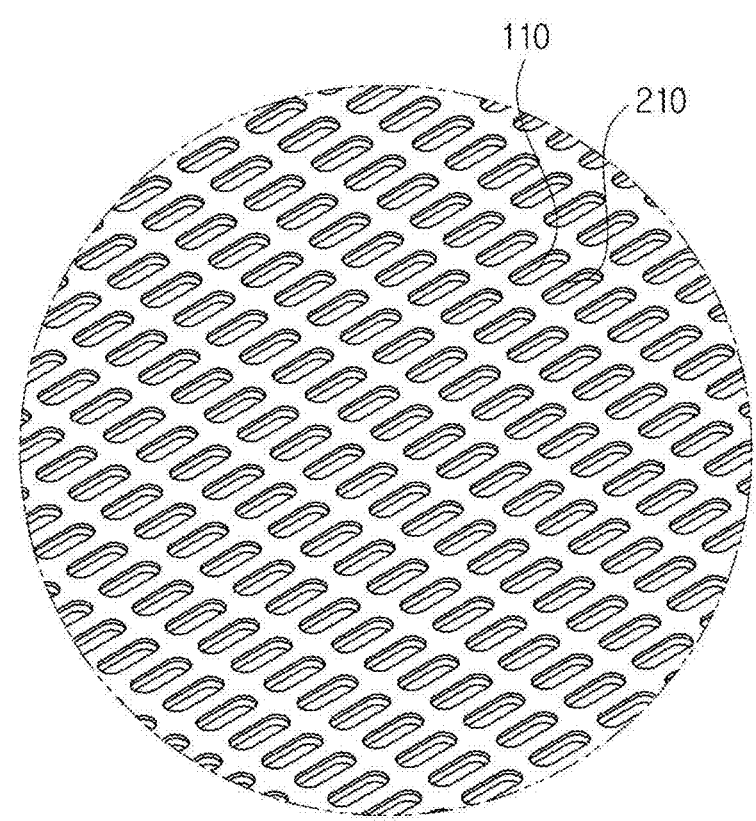
FIG. 2 is an enlarged view illustrating a surface of the vehicle speaker grill according to an embodiment of the present disclosure when the injection molded product and the printed film are assembled.

FIG. 1 is a perspective view illustrating a state before an injection molded product 100 and a printed film 200 are assembled in a vehicle speaker grill 10 according to an embodiment of the present disclosure, and FIG. 2 is an enlarged view illustrating a surface of the vehicle speaker grill 10 according to an embodiment of the present disclosure when the injection molded product 100 and the printed film 200 are assembled.

Referring to FIGS. 1 and 2, the vehicle speaker grill 10 according to an embodiment of the present disclosure is composed of an outer cover and an inner cover having a plurality of holes. The outer cover is disposed toward a passenger inside the vehicle and is mainly made of a metallic material, and the inner cover is disposed behind the outer cover and is mainly made of a plastic material.

When the inner cover and the outer cover are coupled, an inner peripheral surface of a hole in the inner cover may be seen through a hole in the outer cover, as illustrated in FIG. 2. In other words, a hole 110 in the injection molded product is exposed to the passengers of the vehicle through a hole 210 in the printed film, which will be described later. Therefore, a color of the inner cover may be provided to contrast with a color of the outer cover, thereby improving aesthetics of the speaker grill 10.

Conventionally, the outer cover was manufactured on the inner cover through a painting process, but this process is complex and generates volatile organic compounds (VOCs), causing health problems for workers and air pollution. Therefore, embodiments of the present disclosure solve the conventional problems through a molding process and a post-process that replace the painting process.

The molding method of the vehicle speaker grill 10 according to an embodiment of the present disclosure largely includes the molding process and the post-process. The molding process is a process of transferring the printed film 200, which becomes the outer cover, to the injection molded product 100, which becomes the inner cover, and the post-process is a process of increasing completeness of products by processing the injection molded product 100 to which the printed film 200 is transferred after the molding process.

Figure 7:
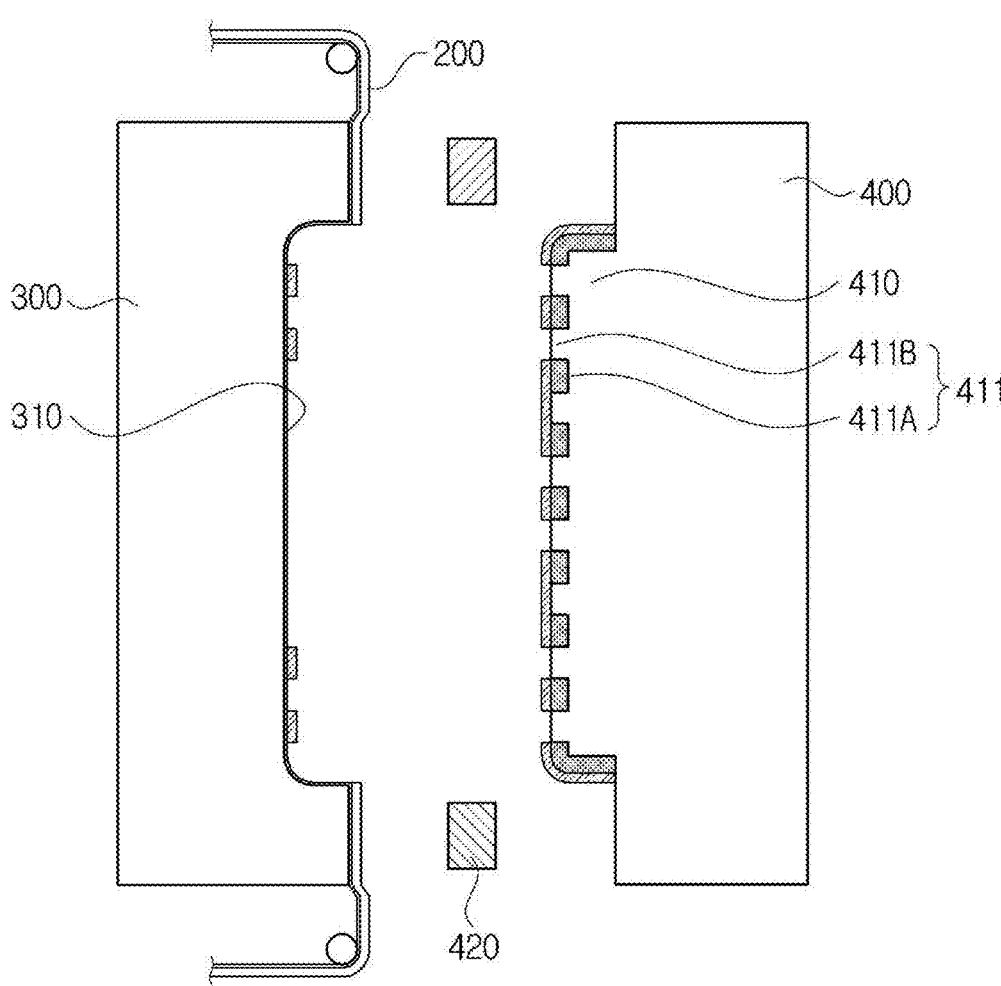
FIG. 7 is a cross-sectional view illustrating a step in which the first mold and the second mold are mold opened during the molding process of the vehicle speaker grill according to an embodiment of the present disclosure.
Figure 8:
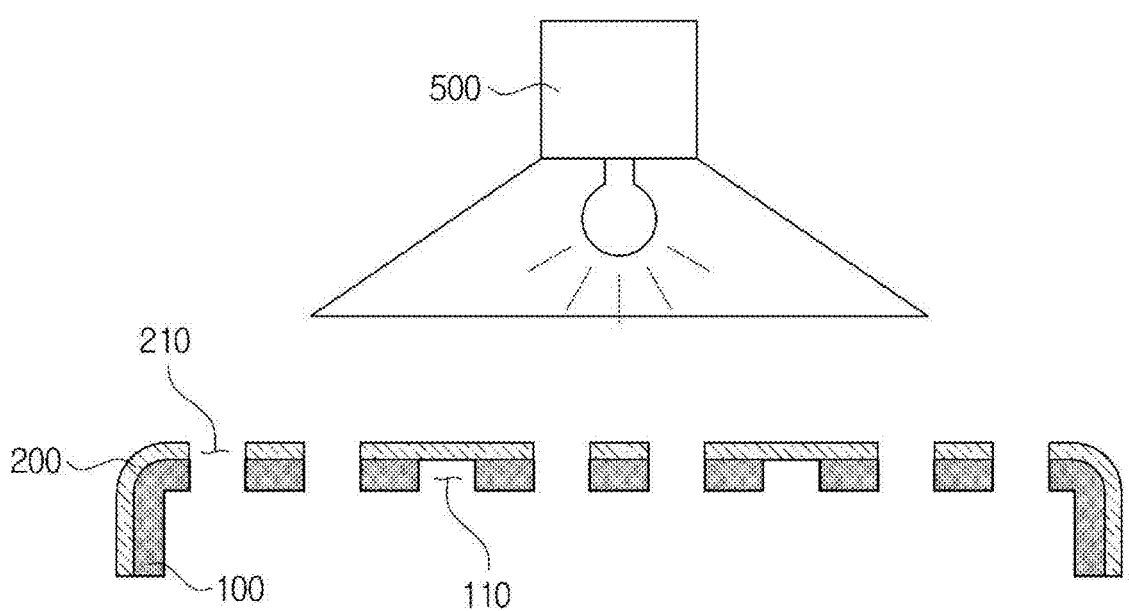
FIG. 8 is a cross-sectional view illustrating a step of curing the extracted printed film during the molding process of the vehicle speaker grill according to an embodiment of the present disclosure.
Figure 9:
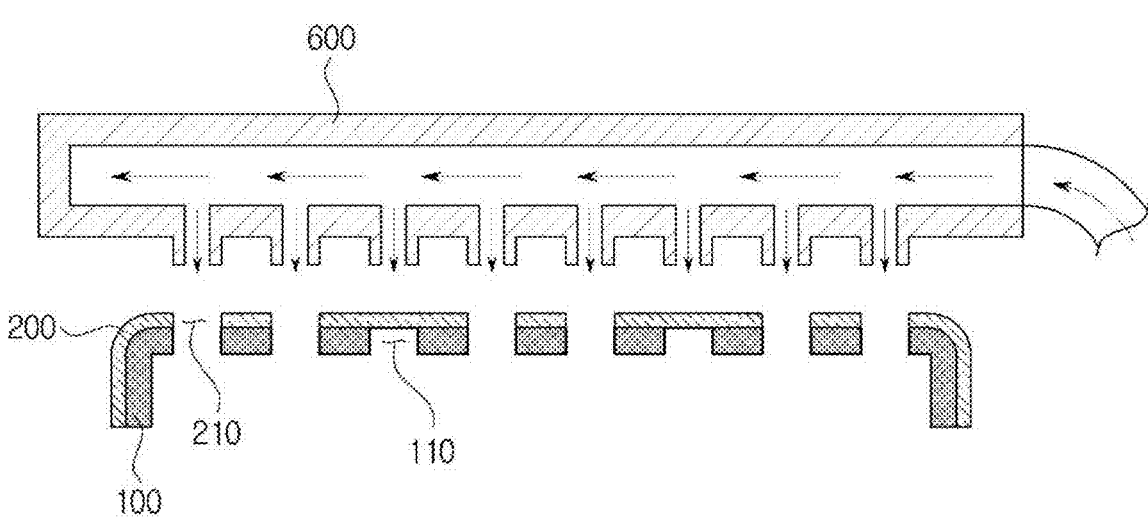
FIG. 9 is a cross-sectional view illustrating an air shower step during a post-process of the vehicle speaker grill according to an embodiment of the present disclosure.
Figure 10:
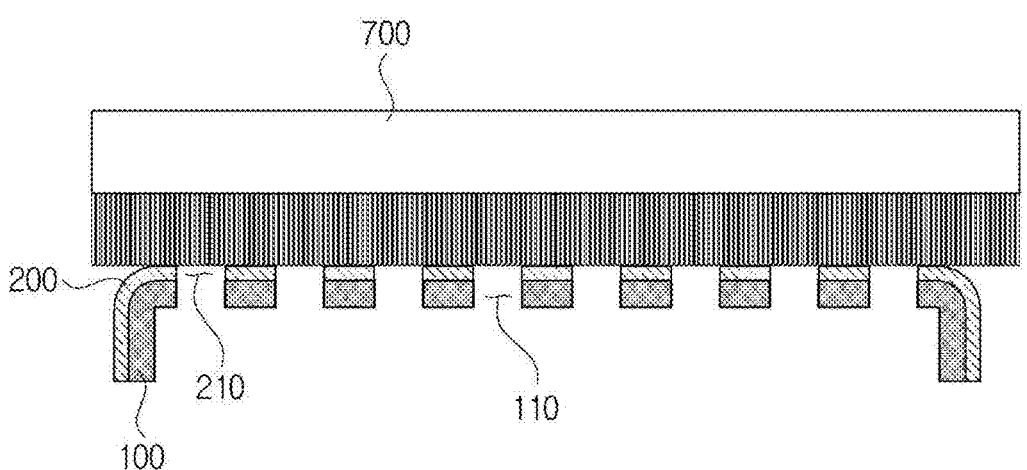
FIG. 10 is a cross-sectional view illustrating a brushing step during the post-process of the vehicle speaker grill according to an embodiment of the present disclosure.

FIGS. 3 to 8 illustrate the molding process of the vehicle speaker grill 10 according to an embodiment of the present disclosure, and FIGS. 9 and 10 illustrate the post-process of the vehicle speaker grill 10 according to an embodiment of the present disclosure.

Figure 3:
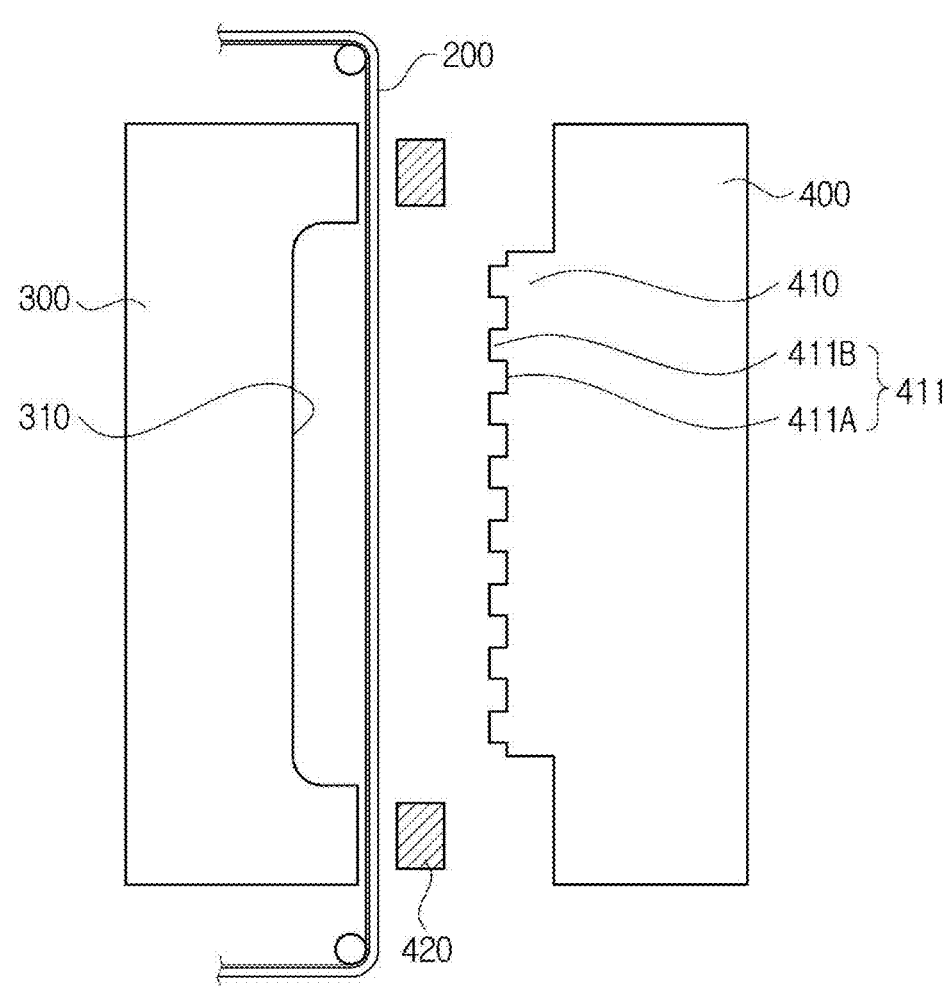
FIG. 3 is a cross-sectional view illustrating a step in which the printed film is charged during a molding process of the vehicle speaker grill according to an embodiment of the present disclosure.

FIG. 3 is a cross-sectional view illustrating a step in which the printed film 200 is charged during the molding process of the vehicle speaker grill 10 according to an embodiment of the present disclosure.

Referring to FIG. 3, the components for molding the vehicle speaker grill 10 according to an embodiment of the present disclosure include a first mold 300 and a second mold 400.

One of the first mold 300 and the second mold 400 is a fixed mold and the other is a movable mold. In an embodiment of the present disclosure, the first mold 300 is provided as a fixed mold and the second mold 400 is provided as a movable mold.

The first mold 300 includes a film molding groove part 310 that is recessed on a mold closing surface, and the second mold 400 includes an insert part 410 that protrudes on a mold closing surface. The insert part 410 is opposite to the film molding groove part 310, but is provided with a plurality of irregularities 411. The irregularity 411 includes a convex portion 411B protruding toward the first mold 300 and a concave portion 411A recessed toward the second mold 400, based on the insert part 410.

With the first mold 300 and the second mold 400 open, the printed film 200 is charged between the first mold 300 and the second mold 400. The printed film 200 may be provided on the mold closing surface of the first mold 300 in a roll-to-roll manner. The printed film 200 may be made of a metallic material. The metallic material refers to a metal material mainly composed of metal elements or metal alloys, and therefore, a metallic film refers to a thin film composed of metal layers. However, the printed film 200 of the present disclosure is not limited to the metal material, and includes non-metal materials or non-metal materials that look like metal materials.

The printed film 200 may be formed by stacking a plurality of layers. Specifically, the printed film 200 may be stacked with a carrier film, a release layer, a colored layer, and an adhesive layer, and the adhesive layer may serve to increase a bonding strength with the injection molded product 100, and the release layer may serve to separate the transferred printed film 200 from the carrier film.

Figure 4:
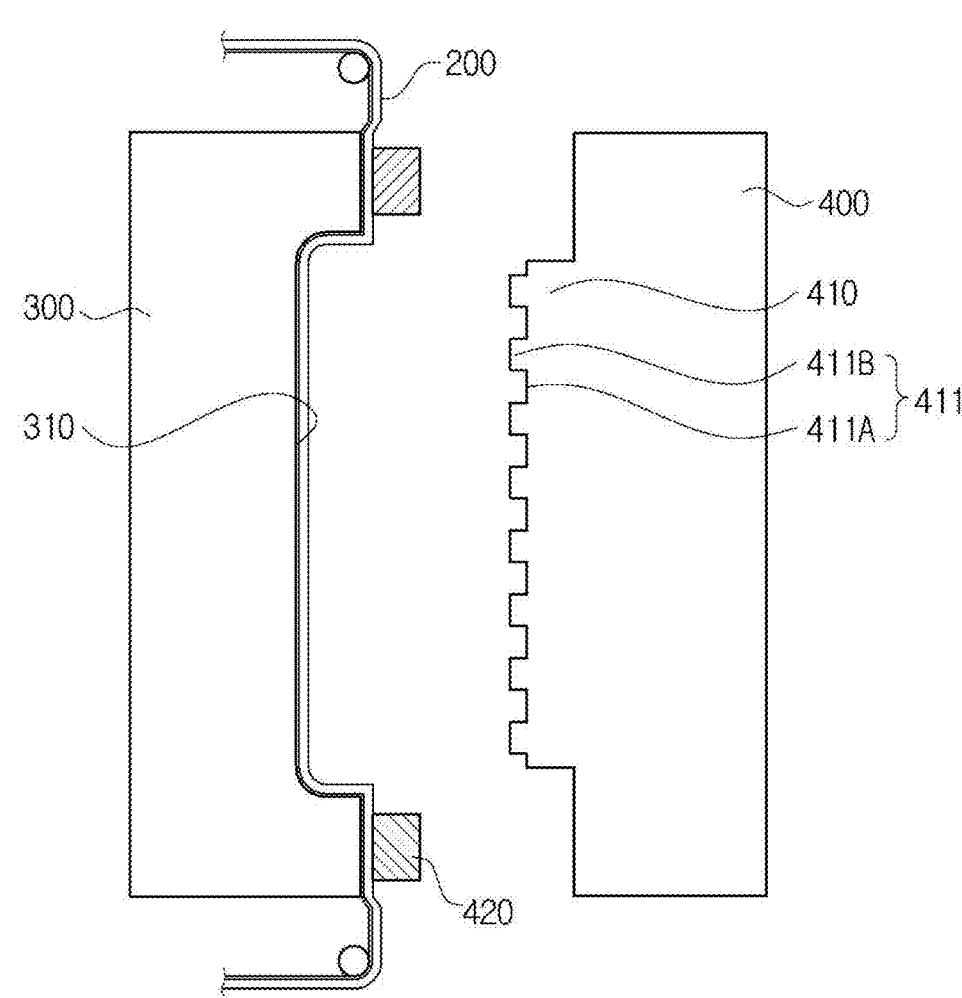
FIG. 4 is a cross-sectional view illustrating a step of vacuum forming the printed film during the molding process of the vehicle speaker grill according to an embodiment of the present disclosure.

FIG. 4 is a cross-sectional view illustrating a step of vacuum forming the printed film 200 during the molding process of the vehicle speaker grill 10 according to an embodiment of the present disclosure.

Referring to FIG. 4, the charged printed film 200 may be vacuum formed into the film molding groove part 310. In this case, the printed film 200 may be vacuum formed to adhere to an inner surface of the film molding groove part 310 and correspond to the shape of the inner surface.

The charged printed film 200 may be pressed and fixed with a support member 420 provided on an outer side of the second mold 400 before or simultaneously with vacuum molding. Specifically, the support member 420 may pressurize and fix the charged printed film 200 by moving toward the first mold 300 by a mechanical or electronic method. Therefore, the next process may stably be performed by fixing the position of the charged printed film 200 on the mold closing surface of the first mold 300.

Figure 5:
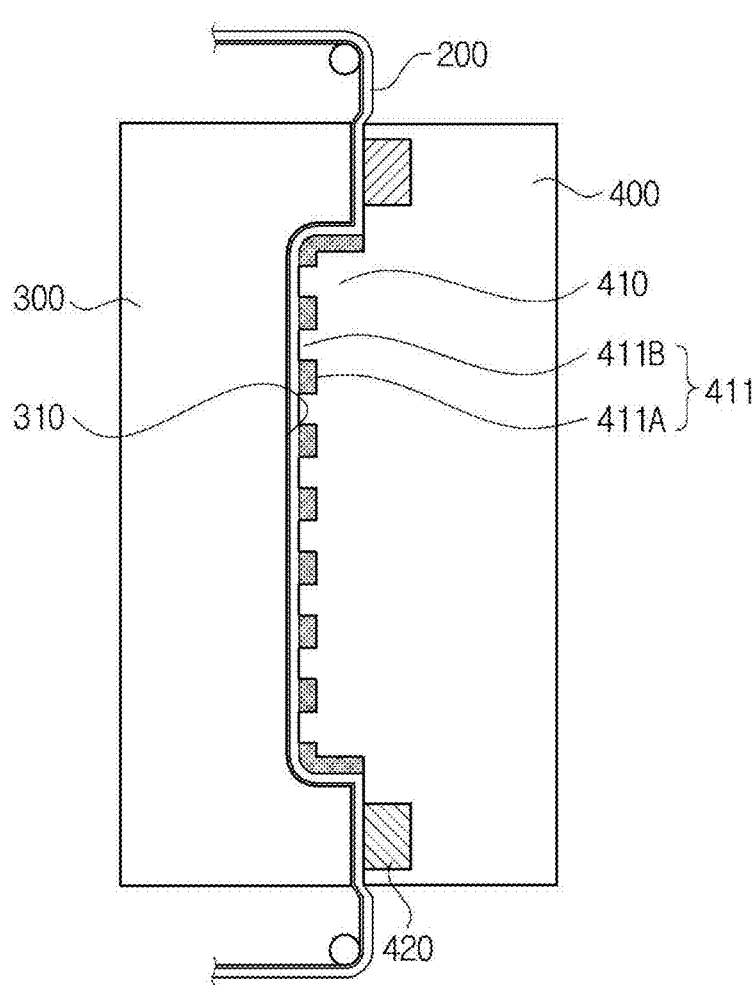
FIG. 5 is a cross-sectional view illustrating a step of mold closing a first mold and a second mold during the molding process of the vehicle speaker grill according to an embodiment of the present disclosure.
Figure 6:
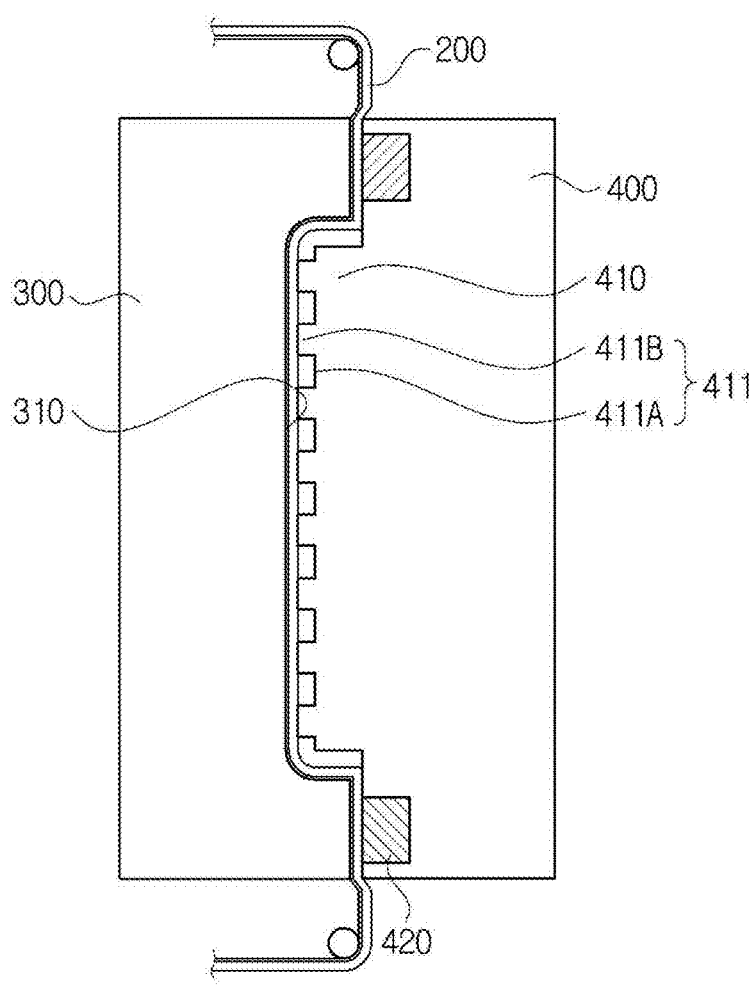
FIG. 6 is a cross-sectional view illustrating a step of injecting a resin and transferring a printed film during the molding process of the vehicle speaker grill according to an embodiment of the present disclosure.

FIG. 5 is a cross-sectional view illustrating the mold closing step of the first mold 300 and the second mold 400 during the molding process of the vehicle speaker grill 10 according to an embodiment of the present disclosure, and FIG. 6 is a cross-sectional view illustrating a step of injecting a resin and transferring the printed film 200 during the molding process of the vehicle speaker grill 10 according to an embodiment of the present disclosure.

Referring to FIGS. 5 and 6, the second mold 400, which is a movable mold, moves toward the first mold 300 which is a fixed mold, and the first mold 300 and the second mold 400 are mold closed. In this case, the support member 420 is inserted into a receiving portion provided in the second mold 400, so that one surface of the support member 420 forms the same surface as the mold closing surface of the second mold 400.

Thereafter, the resin is injected between the printed film 200 and a concave portion 411A of the irregularity 411 to become the injection molded product 100. The resin may be a plastic resin formed through a polymerization reaction, and the injected melted resin has high heat. Accordingly, the part of the printed film 200 that is in contact with the injection molded product 100 in the printed film 200 is transferred to the injection molded product 100 by the heat of the injection molded product 100.

A concave portion 411A of the irregularity 411 serves as a cavity into which the resin is injected, and a convex portion 411B of the irregularity 411 serves to block between the concave portion 411A and the concave portion 411A. When the concave portion 411A is provided in the shape of a hole recessed inside the second mold 400, the injection molded product 100 is formed with a hole 110 in the injection molded product, and the transferred printed film 200 is also provided with a hole 210 in the printed film.

The film molding groove part 310 is recessed inside the first mold 300, and the insert part 410 is formed to protrude toward the first mold 300, but the film molding groove part 310 may be provided to be larger than the insert part 410. Therefore, the resin may also be injected between the concave portion 411A provided on an outermost side of the insert part 410 and an inner side surface of the film molding groove part 310, so the outermost side of the injection molded product 100 and the outermost side of the transferred printed film 200 may be provided in a curved shape.

The injection molded product 100 may be prepared with a resin having a color that contrasts with a color of the printed film 200. For example, the printed film 200 may be a metallic color made of a metallic material, and the injection molded product 100 may be a single color such as yellow, blue, or red. Therefore, when the inner cover and the outer cover are coupled as illustrated in FIG. 2, the metallic colored surface of the printed film 200 may be seen and the monochromatic inner peripheral surface of the injection hole may be seen through the hole 210 in the printed film, thereby improving the aesthetics of the speaker grill 10.

FIG. 7 is a cross-sectional view illustrating a step in which the first mold 300 and the second mold 400 are mold opened during the molding process of the vehicle speaker grill 10 according to an embodiment of the present disclosure.

Referring to FIG. 7, after the mold opening the first mold 300 and the second mold 400, the injection molded product 100 to which the printed film 200 is transferred may be extracted.

When the concave portion 411A of the irregularity 411 has a hole shape recessed inside the second mold 400, the injection molded product 100 and the transferred printed film 200 each have the hole 110 in the injection molded product and the hole 210 in the printed film. In this case, since the hole 110 in the injection molded product and the hole 210 in the printed film are the same size, after extracting the injection molded product 100 to which the printed film 200 has been transferred, the transferred printed film 200 may be processed so that the size of the hole 210 in the transferred printed film is smaller than the size of the hole 110 in the injection molded product. The processing process may be performed after the injection molded product 100 to which the printed film 200 has been transferred is extracted or before it is cured, or after it is extracted and cured. Although a separate process is added to large process the hole 210 in the transferred printed film, the aesthetics may be improved by further exposing the injection molded product 100, which is the inner cover, to the outside.

FIG. 8 is a cross-sectional view illustrating a step of curing the extracted printed film 200 during the molding process of the vehicle speaker grill 10 according to an embodiment of the present disclosure.

Referring to FIG. 8, after extracting the injection molded product 100 to which the printed film 200 is transferred, a step of curing the extracted printed film 200 may be further included. In this case, the used curing device 500 may utilize ultraviolet rays.

The molding process according to an embodiment of the present disclosure transfers the printed film 200 through the heat of the injection molded product 100. The purpose of the molding process is to form the hole 210 in the printed film in the printed film 200 to correspond to the hole 110 in the injection molded product, but the heat transmitted from the injection molded product 100 to the printed film 200 may not be completely controlled, so a problem occurs in which the hole 210 in the printed film are not properly formed. In other words, the printed film 200 may cover the hole 110 in the injection molded product without providing the hole 210 in the printed film. Therefore, in order to prevent such problems, the embodiment of the present disclosure provides the post-process to improve the completeness of the product after the molding process.

FIG. 9 is a cross-sectional view illustrating an air shower step during the post-process of the vehicle speaker grill 10 according to an embodiment of the present disclosure.

Referring to FIG. 9, in the air shower step, by injecting air into the upper surface of the extracted printed film 200, the transferred portion other than the upper surface of the injection molded product 100 may be removed from the transferred printed film 200.

An air shower device 600 used in the air shower may be provided with an inlet opening through which air flows in on one side and an outlet opening through which air flows out on a surface opposite to the transferred printed film 200. A plurality of outlet openings may be provided, and the outlet opening may be provided smaller than the inlet opening, so that the pressure of the outflowing air is greater than the air pressure of the inflowing air.

FIG. 10 is a cross-sectional view illustrating a brushing step during the post-process of the vehicle speaker grill 10 according to an embodiment of the present disclosure.

Referring to FIG. 10, in the brushing step, the micro burrs of the printed film 200 may be removed by rubbing the upper surface of the extracted printed film 200 with the brush of the brush device 700. In this case, the micro burr is a thin, fin-shaped excess part that occurs when processing metal, etc. In an embodiment of the present disclosure, the injection molded product 100 is exposed to the outside through the hole 210 of the printed film to improve the aesthetics of the vehicle interior. Accordingly, the process of removing the micro burrs so that the size of the hole 210 in the plurality of printed films is constant and the size of the hole 210 in the single printed film is not larger than the size of the hole 110 in the injection molded product plays an important role in improving the aesthetics of the vehicle interior. The brushing may be performed after the air shower.

The molding method of the vehicle speaker grill 10 according to the embodiment of the present disclosure includes a molding process of transferring the printed film 200 onto the injection molded product 100 through the heat of the injection molded product 100, so it is possible to improve the efficiency of the process compared to the painting process, improve the stability of the process and at the same time, implement the eco-friendly process as the volatile organic compounds generated from the painting material are not generated, and improve the completeness of the vehicle speaker grill 10 through the air shower device

600 and the brush device 700 after the molding process. The vehicle speaker grill 10 produced in this way not only improves the aesthetics of the vehicle interior and increases the marketability of the vehicle.

What is claimed is:

1. A molding method of a vehicle speaker grill, comprising:

a molding process of transferring a printed film to an injection molded product; and a post-process of processing the injection molded product to which the printed film is transferred, wherein the molding process includes charging #the printed film between a first mold provided with a film molding groove part and a second mold provided with an insert part that is opposite to the film molding groove part and provided with a plurality of irregularities, mold closing the first mold and the second mold so that an upper surface of the irregularity is in contact with the printed film, vacuum molding a charged printed film into the film molding grooce part, injecting a resin between the printed film and a concave portion of the irregularity, and transferring a portion of the printed film, which is in contact with the injection molded product, to the injection molded product side by heat of the injection molded product, wherein the portion of the printed film which is in contact with the injection molded product is cut off, and mold opening the first mold and the second mold and extracting the injection molded product to which the printed film is transferred, and the post-process includes removing the transferred portion other than the upper surface of the injection molded product from a transferred printed film by injecting air into the upper surface of an extracted printed film through an inlet opening of an air shower device, wherein the air shower device includes the inlet opening through which air flows in on one side and an outlet opening through which air flows out on a surface opposite the printed film, the outlet opening being smaller than the inlet opening.

2. The method of claim 1, wherein the post-process further includes removing micro burrs of the printed film by rubbing the upper surface of the extracted printed film with a brush.

3. The method of claim 1, wherein the molding process further includes curing the extracted printed film.

4. The method of claim 1, wherein the molding process includes moving a support member provided on an outer side of the second mold to the first mold to press and fix the charged printed film.

5. The method of claim 1, wherein the concave portion is provided in a shape of a hole recessed inside the second mold, and the molding process further includes processing the transferred printed film so that a size of the hole in the transferred printed film is smaller than that of the hole in the injection molded product.

6. The method of claim 1, wherein, in the molding process, the printed film is provided with a metallic material.

7. The method of claim 1, wherein, in the molding process, the injection molded product is made of a resin having a color that contrasts with a color of the printed film.

8. The method of claim 1, wherein the film molding groove part is recessed inside the first mold, and the insert part protrudes toward the first mold, and the film molding groove part is larger than the insert part, and in the molding process, when a resin is injected between the printed film and the concave portion of the irregularity, and the portion of the printed film in contact with the injection molded product is transferred to the injection molded product side by the heat of the injection molded product, the resin is also injected between the concave portion provided at an outermost side of the insert part and an inner side surface of the film molding groove part.

9. The method of claim 3, wherein the molding process uses ultraviolet rays when curing the extracted printed film.

* * * * *